UNITED STATES PATENT OFFICE.

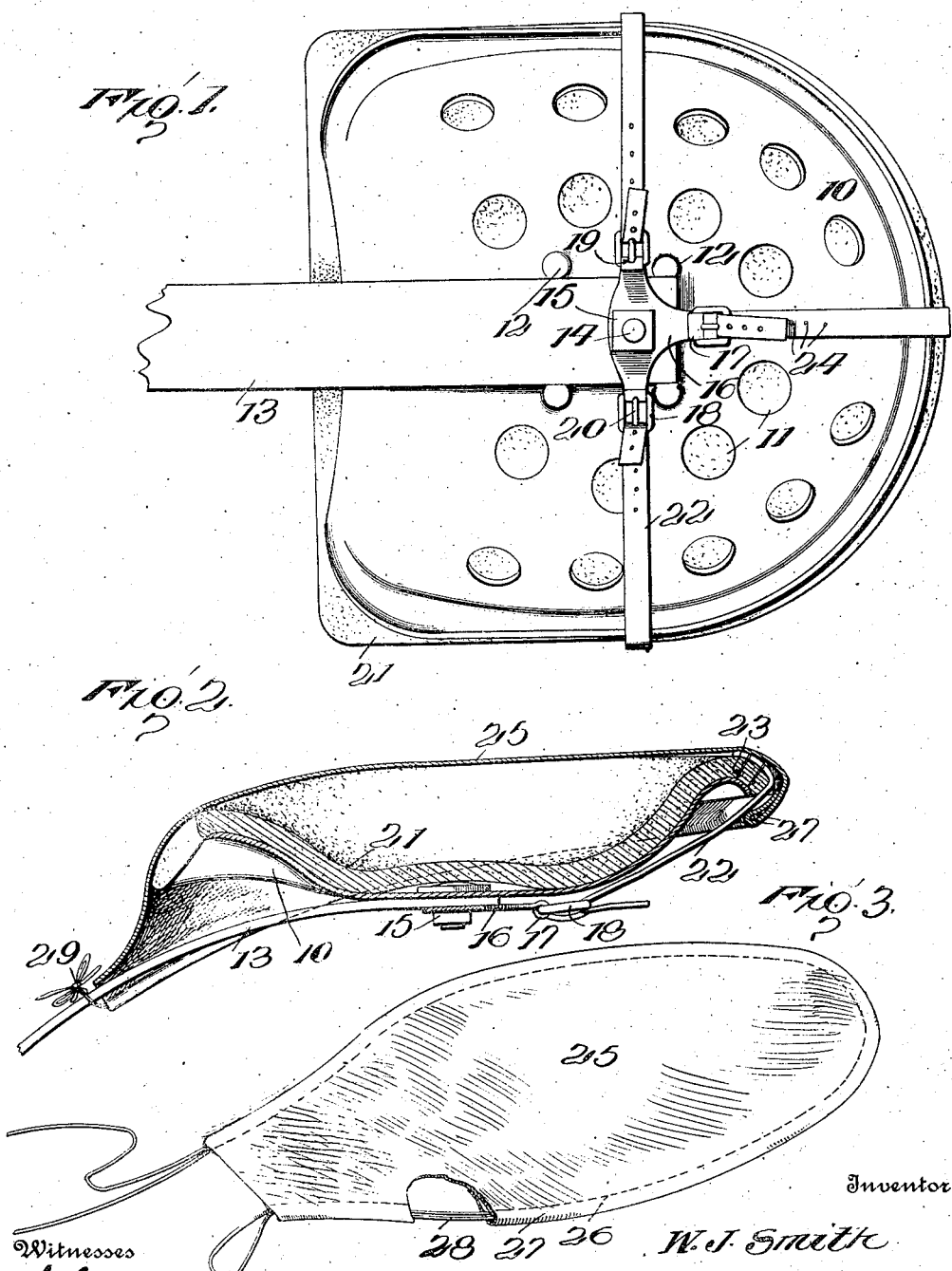

WILLIAM J. SMITH, OF MAX, NORTH DAKOTA, ASSIGNOR OF ONE-HALF TO PETER D. PODHOLA, OF MAX, NORTH DAKOTA.

SEAT CUSHION AND COVER.

1,156,939.      Specification of Letters Patent.      Patented Oct. 19, 1915.

Application filed February 25, 1915. Serial No. 10,481.

*To all whom it may concern:*

Be it known that I, WILLIAM J. SMITH, a citizen of the United States, residing at Max, in the county of McLean and State of North Dakota, have invented certain new and useful Improvements in Seat Cushions and Covers, of which the following is a specification.

My invention relates to new and useful improvements in seat cushions and covers and more particularly to cushions and covers for the seats of agricultural implements, such as mowers, rakes, binders and the like, the primary object of my invention being the provision of a cushion which may be readily attached to a pressed or stamped out sheet metal seat of the usual construction employed on such implements.

A further object of my invention is to provide a water proof cover for the seat which may be employed at all times, but which will usually be employed when the seat is not in use. In this connection, still further objects consist in the provision of novel means for fastening the cushion to the seat and the cover about the cushion.

With these and other objects in view, my invention will be more fully described, illustrated in the accompanying drawing, and then specifically pointed out in the claims which are attached to and form a part of this application.

In the drawings: Figure 1 is a bottom plan view of a conventional form of seat, showing my cushion applied thereto; Fig. 2 is a central, longitudinal sectional view taken through the seat cushion and cover; Fig. 3 is a perspective view of the cover.

Corresponding and like parts are referred to in the following description and indicated in all the views of the drawings by the same reference characters.

In order to insure a clear and accurate understanding of my invention, I have illustrated my improved seat cushion and cover in connection with a conventional form of pressed or stamped out sheet metal seat 10 of the type commonly employed with wheeled farm implements. The body of this seat is preferably provided with ventilating openings 11 and substantially centrally and downwardly projecting bosses 12 arranged to form abutments between which the upper end of the leaf spring seat post 13 may be engaged. This seat is secured to the seat post by means of a bolt 14 passed through the seat and seat post and provided with a nut 15. With the ordinary seat post construction, some suitable form of washer is interposed between the nut and seat post and I provide a particular type of washer, indicated at 16, which also serves as an attaching means for my cushion. This washer is stamped or otherwise formed from sheet metal and is provided with a pair of diametrically extending arms and with a third arm projecting at right angles from the body and between the first arms, the washer being ordinarily applied to the bolt in such a manner that the two first mentioned arms extend toward the sides of the seat and the last mentioned arm toward the rear. Each arm, at its free end, is bent back to form an eye 17 to receive one end of a buckle forming loop 18, being perforated at 19 to receive the tongue 20 of the buckle.

The cushion proper includes a body portion 21 shaped to conform to the contour of the seat when pressed into engagement therewith and preferably formed of heavy felt or similar material. Secured to the intermediate portions of the sides and rear of the cushion 21, are straps 22, the straps preferably extending over the upper edge portions of the cushion and being secured by stitching 23. The free end portions of the straps are perforated, as shown at 24, to adjustably receive the tongues 20 of the buckles 18 when the cushion is in place, the free ends of the straps being passed beneath the seat for this purpose. It will, therefore, be clear that the straps, having connections with the buckles carried by the washer 16, serve to prevent displacement of the cushion while, because of the fact that the buckles are carried by the washer, the seat and straps hold the washer against turning movement and therefore tend to additionally prevent displacement of the nut 15, the washer, for this reason, being even more effective than the ordinary type of washer.

The above described cushion may be employed without any cover or with a cover, as preferred. In either event, a cover is preferably provided to protect it from dirt and moisture when the seat is not in use. In Fig. 3, I have illustrated the preferred embodiment of the cover 25 which is formed of oilcloth, rubber impregnated fabric or any other suitable material, preferably water-proof. This cover is substantially circular in shape, being provided at its forward side with a radial extension. The free edge of the cover, with the exception of the end portion of this extension, is inturned and secured by stitches 26 to provide a peripheral hem 27 and a draw string 28 is passed through this hem with its free end projecting beyond the ends of the hem. This draw string is preferably doubled for added strength and the end portions project sufficiently to permit their being tied about the seat post, as shown at 29 in Fig. 2, when the cover is in place.

In applying the cover, the body portion is positioned over the cushion and, being so proportioned as to extend somewhat beyond the sides and back of the seat and its cushion, its free edge may be drawn beneath the seat throughout the greater portion of its circumference by means of the draw string 28, the cover thereby being held against displacement from the cushion. The draw string is then knotted about the seat post in the manner shown.

From the foregoing description, it will be obvious that I have provided a combined cushion and seat post for seats of the type conventionally employed upon wheeled farm implements and like vehicles and one which may be readily applied to any seat or removed therefrom. It will further be clear that the entire attachment may be made and installed at relatively small cost. It will of course be understood that I do not wish to limit myself to the specific details of construction illustrated, as various minor changes, within the scope of the appended claims, may be made at any time, without in the slightest degree departing from the spirit of my invention.

Having thus described the invention, what is claimed as new is:

1. The combination with a seat and seat post secured to each other by a bolt and nut, of a cushion and a cover for the cushion, straps carried by the cushion, a washer interposed between the seat post and nut, and means for attaching the straps to the washer.

2. The combination with a seat and seat post secured to each other by a bolt and nut, of a cushion and a cover for the cushion, straps carried by the cushion, a washer interposed between the seat post and nut, and means for attaching the straps to the washer, said means including extensions formed upon the washer, and buckles carried by the extensions.

3. The combination with a seat and seat post and a bolt and nut connecting the same, of a cushion for the seat, a washer disposed between the seat post and the nut and secured in place by the said nut, the washer having arms extending laterally toward opposite sides of the seat and having an arm extending rearwardly toward the rear side of the seat, buckles permanently connected with the said arms at their extremities, and straps carried by the cushion and adjustably engageable with the said buckles.

In testimony whereof I affix my signature in presence of two witnesses.

WILLIAM J. SMITH. [L. S.]

Witnesses:
   P. D. Podhola,
   A. H. Seltz.